United States Patent
Lomba et al.

(10) Patent No.: US 7,361,879 B2
(45) Date of Patent: Apr. 22, 2008

(54) METHOD FOR CAPTURING AN IMAGE WITH AN ELECTRONIC HANDHELD DEVICE

(75) Inventors: Vincent Lomba, Houilles (FR); Christophe Castellano, Chevilly Larue (FR)

(73) Assignee: T & A Mobile Phone Limited, Hong Kong (CN)

( * ) Notice: Subject to any disclaimer, the term of this patent is extended or adjusted under 35 U.S.C. 154(b) by 0 days.

(21) Appl. No.: 11/453,556

(22) Filed: Jun. 15, 2006

(65) Prior Publication Data

US 2007/0099655 A1 May 3, 2007

(30) Foreign Application Priority Data

Jul. 28, 2005 (EP) .................................. 05106961

(51) Int. Cl.
*H04N 5/225* (2006.01)
*H04M 1/00* (2006.01)

(52) U.S. Cl. ................................ 250/208.1; 455/556.1
(58) Field of Classification Search ............. 250/208.1; 455/556.1, 56, 572; 348/241
See application file for complete search history.

(56) References Cited

U.S. PATENT DOCUMENTS

| 4,305,649 | A | 12/1981 | Nagaoka et al. ............. 354/139 |
| 4,755,885 | A | 7/1988 | Okino et al. ................ 358/335 |
| 6,822,633 | B2 * | 11/2004 | Takaoka et al. ............ 345/102 |
| 7,097,318 | B2 * | 8/2006 | Yoshihara .................... 362/88 |
| 2002/0187752 | A1 | 12/2002 | Tate ............................ 455/66 |
| 2004/0085745 | A1 * | 5/2004 | Yoshihara ....................... 362/8 |
| 2004/0209644 | A1 | 10/2004 | Chang et al. ............ 455/556.1 |
| 2004/0239800 | A1 * | 12/2004 | Yamano et al. ............. 348/372 |
| 2005/0085263 | A1 | 4/2005 | Kim et al. ............... 455/556.1 |

OTHER PUBLICATIONS

European Search Report—Jan. 19, 2006.

* cited by examiner

*Primary Examiner*—John R. Lee
(74) *Attorney, Agent, or Firm*—Morgan, Lewis & Bockius LLP

(57) ABSTRACT

A method for capturing an image with an electronic handheld device (1) equipped with a camera unit (2) and capture means (3) for triggering an image capture, said electronic handheld device (1) further comprising power supplying means (4) connected to said camera unit, and at least one additional component (5) also connected to said power supplying means (4) through a DC/DC converter (11), said method comprising a first step (B) for detecting actuation of capture means (3), and a second step (C) for capturing image once actuation of capture means has been detected. According to the invention, said method further comprises an intermediate step (D) for switching said DC/DC converter (11) off for at least the duration of the second step (C).

5 Claims, 3 Drawing Sheets

METHOD FOR CAPTURING AN IMAGE WITH AN ELECTRONIC HANDHELD DEVICE

RELATED APPLICATION

This application is related to and claims the benefit of priority from European Patent Application No. 05 106 961.5, filed on Jul. 28, 2005, the entirety of which is incorporated herein by reference.

FIELD OF THE INVENTION

The present invention concerns a method for capturing an image with an electronic handheld device equipped with a camera unit. More generally, the invention relates to a method to avoid degradation of an image during capture due to noisy environment.

BACKGROUND

Several electronic handheld devices are now proposed which make possible to capture digital images. These devices are for instance classical digital cameras, or other devices such as mobile phones or personal digital assistants offering camera capabilities. Such devices are classically equipped with a camera unit and capture means for triggering an image capture, for instance a dedicated key, or, in case of a mobile phone, a track ball or any navigating means. These devices generally further comprise power supplying means, like a rechargeable battery, for delivering power supply to said camera unit, but also to other components in the device, such as a display unit, a keyboard unit, and/or, in the case of a mobile phone, a transmitting/receiving unit.

For some of these additional components, it may be necessary to increase and to regulate the voltage delivered by the battery. This is the case namely for the display backlight driver or for the keyboard backlight driver which belongs respectively to display unit and to keyboard unit. For this purpose of regulation, a DC/DC converter is generally used connected between the power supplying means output and a component power input. The principle of such a DC/DC converter is to take at a high frequency some amount of current on the battery in order to load a capacitor until a predetermined voltage is reached. However, this induces on the voltage outputting the battery some undesirable voltage drops. If an image is captured at this time, this can lead to a degradation of the overall quality of the captured image. This phenomena gets worse if the display backlight driver is connected to the DC/DC converter, and if an image is to be taken in low ambient light conditions. Indeed, in this case, since the display backlight is also used to preview the image, the noise induced by the DC/DC converter will be so important that it will not be possible to get a correct picture.

One solution to this problem is to provide the electronic handheld device with several big capacitors which filter power supplies. However, these capacitors take too much place in a device for which miniaturized size is an important marketing aspect.

Another solution consists in filtering the image once captured. However, this reduces generally the resolution and thus the overall quality of the picture.

OBJECTS AND SUMMARY OF THE INVENTION

The aim of the invention is to remedy the above drawbacks and limitation of the known solutions.

To this aim, an object of the present invention is to provide a method for capturing an image with an electronic handheld device equipped with a camera unit and capture means for triggering an image capture, said electronic handheld device further comprising power supplying means connected to said camera unit, and at least one additional component also connected to said power supplying means through a DC/DC converter, said method comprising a first step for detecting actuation of capture means, and a second step for capturing image once actuation of capture means has been detected, characterized in that it further comprises an intermediate step for switching said DC/DC converter off for at least the duration of the second step.

Consequently, since the image is captured when there is no noisy environment due to DC/DC converter, there is no degradation of the image's quality.

The method according to the invention preferably further comprises an end step for switching said DC/DC converter on once an image has been captured.

Additionally, other sources of noise can be found in the handheld device. This is especially the case when the device is a mobile phone comprising transmitting/receiving means for communicating with a cellular network. This specific case is also solved thanks to a particular embodiment of the method according to the invention wherein said electronic handheld device also include radio communication means periodically activated for communication with a cellular network. In this case, said method further comprises a step for detecting a communication activity and for delaying said intermediate step until said communication activity ends.

BRIEF DESCRIPTION OF THE DRAWINGS

Other features and advantages of the invention with become apparent from the following description of embodiments of the invention given by way of non-limiting examples only and with reference to the accompanying drawings, in which.

DETAILED DESCRIPTION

Figure 1:
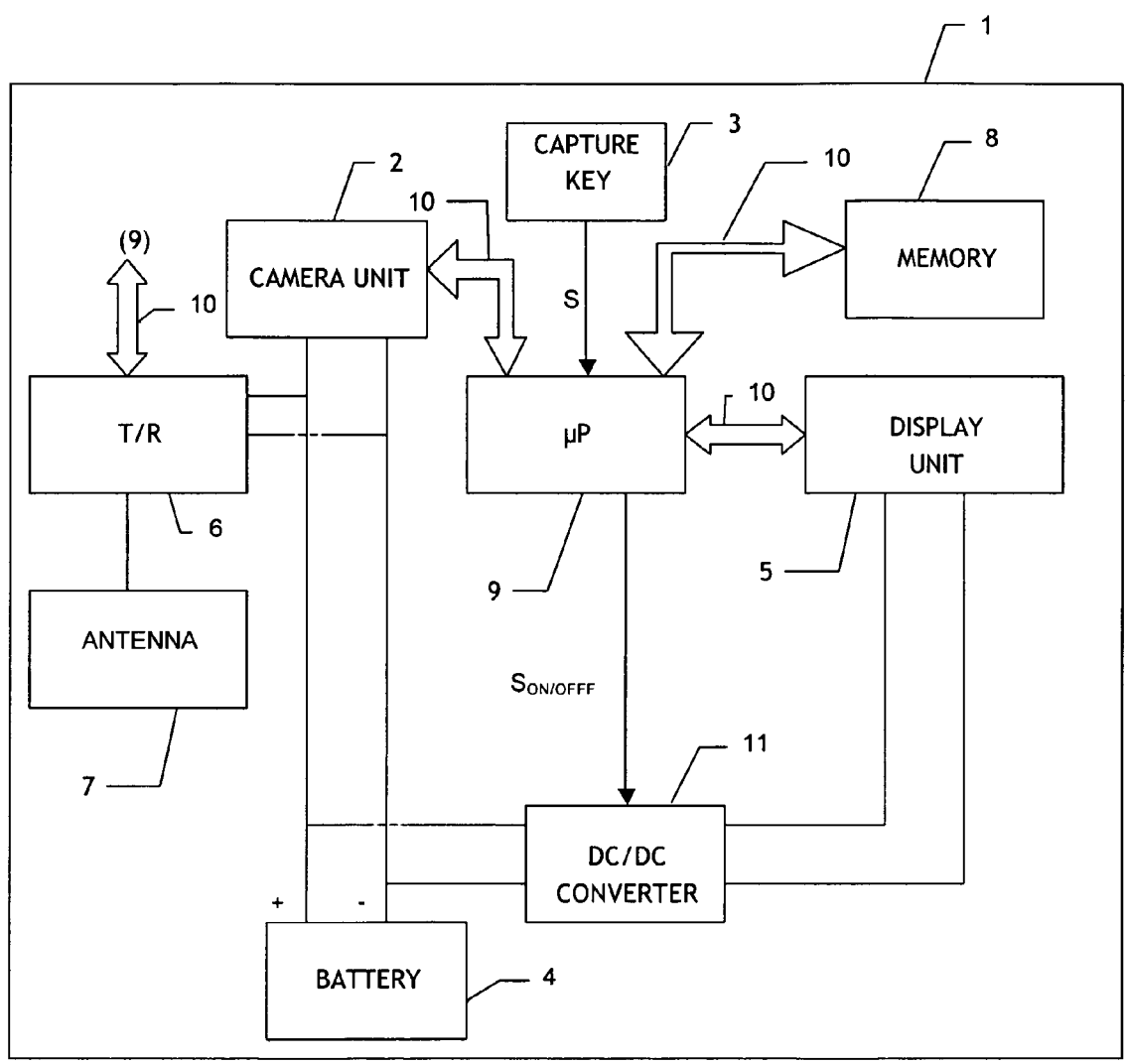
FIG. 1 shows schematically functional block of a possible device implementing the method in accordance with the invention.

FIG. 1 shows an electronic handheld device 1, in the example given, a mobile phone, equipped with a camera unit 2 and capture means 3 such as a dedicated key for triggering an image capture. The electronic handheld device 1 further comprises power supplying means, for instance a rechargeable battery 4, connected to camera unit 2. The device further includes a display unit 5 which can be used to preview images before capture, and radio communication means including transmitting/receiving means 6 connected to an antenna 7 for communication with a cellular network. A memory 8 is also provided to store several data, such as pictures which have been captured by camera unit. The different functions of the device are performed under the control of a microprocessor unit 9 which is linked by buses 10 as shown on FIG. 1 in order to exchange data with camera unit 2, memory 8, display unit 5 and transmitting/receiving means 6.

The device shown on FIG. 1 also comprises at least one additional component also connected to power supplying means 4 through a DC/DC converter 11. For purpose of illustration, this additional device is here the display unit 5, and more precisely the display backlight driver included in said unit for lighting the display.

Figure 2:
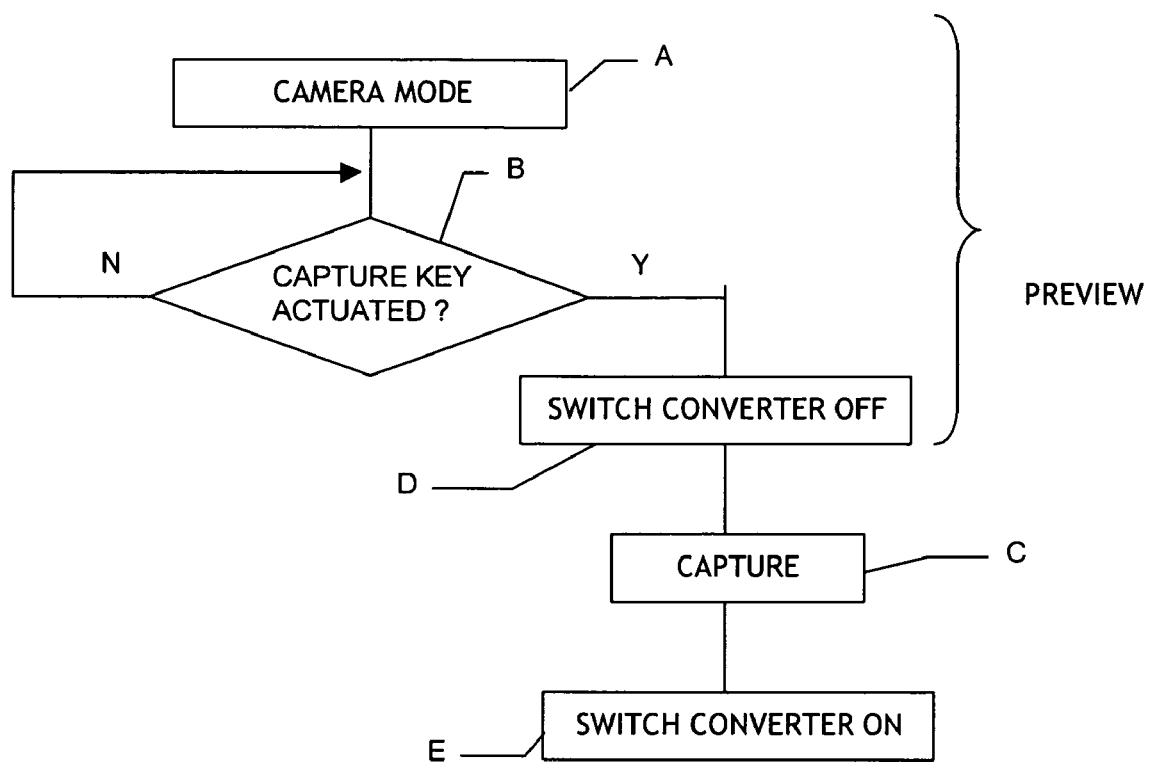
FIG. 2 shows the different steps of the method according to a first embodiment.

As can be seen from FIG. 2, once the device has entered into a camera mode in a initialization step A, the method for capturing an image comprises classically a first step B for detecting actuation of capture means, for instance via a signal S (see FIG. 1) sent by capture key 3 to microprocessor unit 9 when key is depressed.

In a method according to prior art, this first step B would immediately be followed by a second step C for capturing image once actuation of capture means has been detected.

In a different manner, the method according to the invention further comprises an intermediate step D between said first step B and said second step C. This intermediate step D is used for switching said DC/DC converter off for at least the duration of the second step C. This can be performed thanks to a switch off signal $S_{ON/OFF}$ sent by microprocessor unit 9 to DC/DC converter 11, as shown on FIG. 1.

Once picture has been captured (step C), the method advantageously comprises an end step E used for switching said DC/DC converter on again. This can be performed thanks to a switch off signal, which can be the same signal $S_{ON/OFF}$ sent by microprocessor unit 9 to DC/DC converter 11, as shown on FIG. 1.

Figure 3:
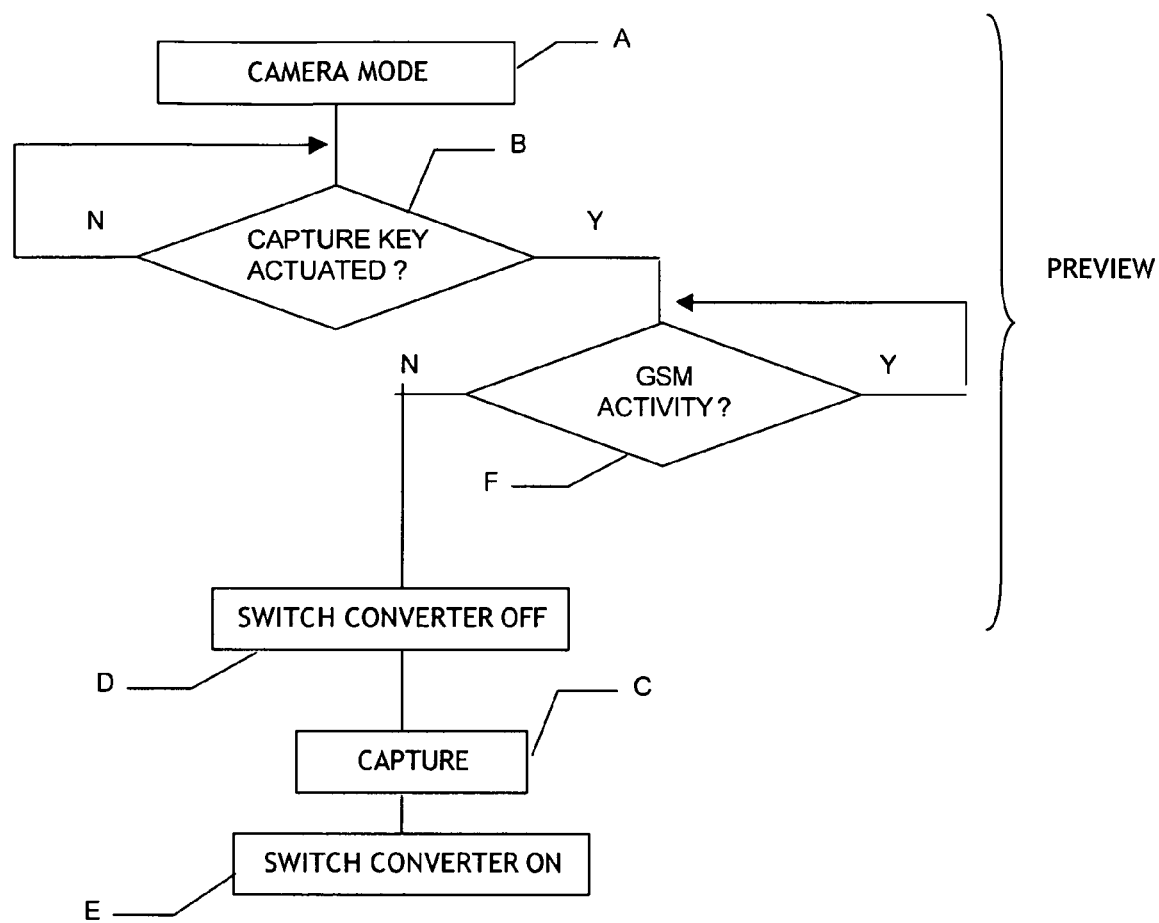
FIG. 3 shows the different steps of the method according to a second embodiment.

The embodiment shown on FIG. 3 is particularly adapted for a mobile phone device. It differs from the embodiment of FIG. 2 in that it further comprises a step F for detecting a communication activity of the mobile with the cellular network, namely a transmission by the mobile, and for delaying intermediate step D until said communication activity ends.

As indicated on FIGS. 2 and 3, steps A, B, D for FIG. 2 and steps A, B, F, D for FIG. 3 can correspond to a preview phase, during which images can be previewed on display 5 at least until the beginning of said intermediate step.

The method has been disclosed in the case the additional component is the display backlight driver. The invention applies also for other cases of additional component connected to battery through a DC/DC converter, for instance a backlight keypad driver or a flash driver.

The invention provides a simple without extra cost solution since only software adaptation is necessary with an extra command to inhibit DC/DC converter 11.

The invention claimed is:

1. Method for capturing an image with an electronic handheld device equipped with a camera unit and capture means for triggering an image capture, said electronic handheld device further comprising power supplying means connected to said camera unit, and at least one additional component also connected to said power supplying means through a DC/DC converter, said method comprising:
    a first step for detecting actuation of capture means; and
    a second step for capturing image once actuation of capture means has been detected, wherein said method further comprises an intermediate step for switching said DC/DC converter off for at least the duration of the second step.

2. Method according to claim 1, further comprising an end step for switching said DC/DC converter on once an image has been captured.

3. Method according to claim 1, wherein said electronic handheld device also include radio communication means periodically activated for communication with a cellular network, wherein said method further comprises a step for detecting a communication activity, and for delaying said intermediate step until said communication activity ends.

4. Method according to claim 1, wherein said electronic handheld device also include a display, wherein images can be previewed on said display at least until the beginning of said intermediate step.

5. Method according to claim 1, wherein said at least additional component is a backlight display driver, or a backlight keypad driver, or a flash driver.

* * * * *